United States Patent [19]
Nishida

[11] Patent Number: 5,828,430
[45] Date of Patent: Oct. 27, 1998

[54] ACTIVE MATRIX TYPE LIQUID CRYSTAL DISPLAY APPARATUS HAVING OPTICAL SHIELD LAYER CAPABLE OF SUPPRESSING DISPLAY DISTORTION

[75] Inventor: Shinichi Nishida, Tokyo, Japan

[73] Assignee: NEC Corporation, Tokyo, Japan

[21] Appl. No.: 834,301

[22] Filed: Apr. 15, 1997

[30] Foreign Application Priority Data

Apr. 15, 1996 [JP] Japan ................................. 8-092080

[51] Int. Cl.⁶ ................................................ G02F 1/136
[52] U.S. Cl. ................................................ 349/44; 349/48
[58] Field of Search ................................ 349/44, 48, 111

[56] References Cited

U.S. PATENT DOCUMENTS

| | | | |
|---|---|---|---|
| 5,351,145 | 9/1994 | Miyata et al. | 359/57 |
| 5,402,254 | 3/1995 | Sasano et al. | 359/59 |
| 5,426,313 | 6/1995 | Sukegawa et al. | |
| 5,701,166 | 12/1997 | Fedorovish et al. | 349/38 |
| 5,764,321 | 6/1998 | Koyama et al. | 349/648 |

OTHER PUBLICATIONS

M. LeContellec et al., "Amorphous and Polycrystalline Silicon TFT for Addressing Display Devices", *SID 82 Digest*, pp. 44–45.

*Primary Examiner*—Anita Pellman Gross
*Assistant Examiner*—Robert J. Hollingshead
*Attorney, Agent, or Firm*—Sughrue, Mion, Zinn, Macpeak & Seas, PLLC

[57] ABSTRACT

In an active matrix type liquid crystal display apparatus including a plurality of scan bus lines, a plurality of signal bus lines, a plurality of pixel electrodes, a plurality of first thin film transistors, each having a gate connected to one of the scan bus lines, a drain connected to one of the signal bus lines and a source connected to one of the pixel electrodes, and a plurality of optical shield layers each for preventing light from penetrating one of the first thin film transistors, a plurality of second thin film transistors, are provided. Each of the second thin film transistors has a gate connected to one of the scan bus lines, a drain connected to one of the signal bus lines and a source connected to one of the optical shield layers.

15 Claims, 9 Drawing Sheets

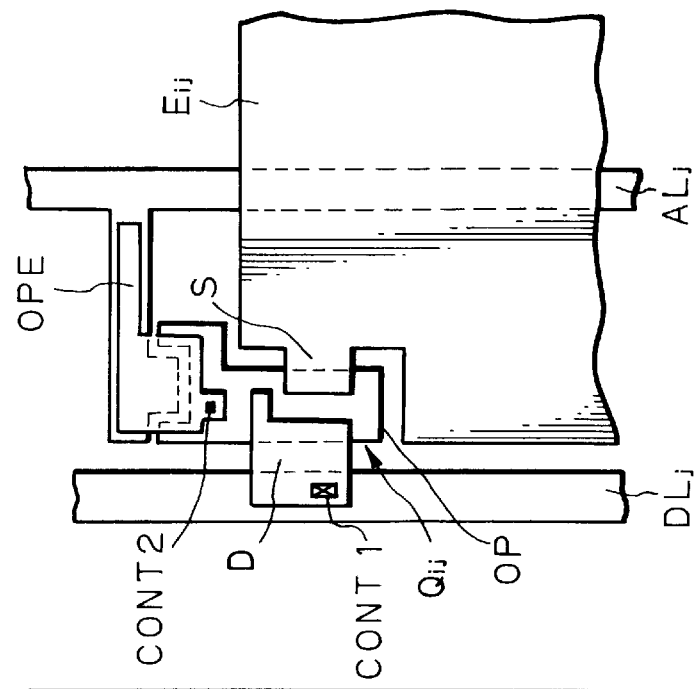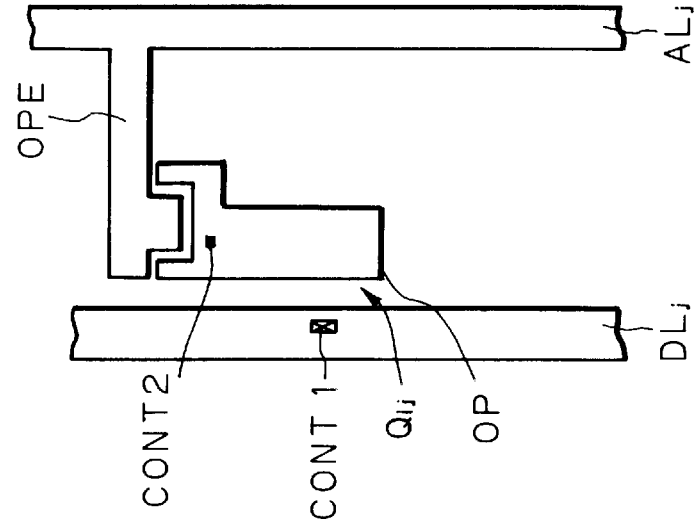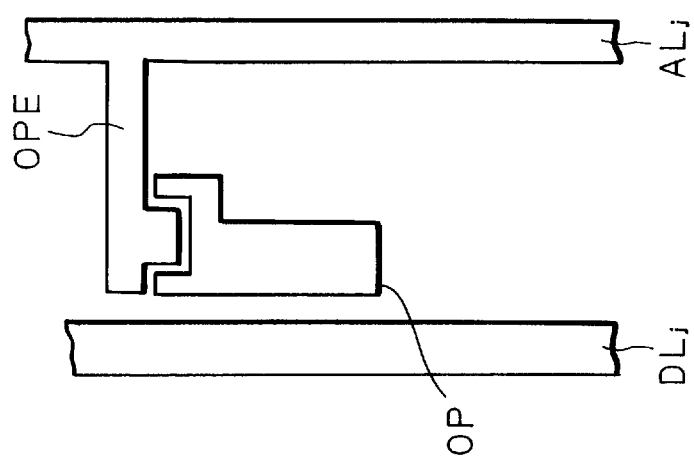

ACTIVE MATRIX TYPE LIQUID CRYSTAL DISPLAY APPARATUS HAVING OPTICAL SHIELD LAYER CAPABLE OF SUPPRESSING DISPLAY DISTORTION

BACKGROUND OF THE INVENTION

1. Field of the Invention

The present invention relates to an active matrix type liquid crystal display (LCD) apparatus.

2. Description of the Related Art

An active matrix type LCD apparatus is thin, so that it is often used in various display apparatuses. In this active matrix type LCD apparatus, since individual pixel electrodes are independently driven, the contrast is not reduced based upon the reduction of a duty ratio, and also, the angle of visibility is not reduced, even when the capacity of display is increased to increase the number of lines.

In the active matrix type LCD apparatus, one TFT is provided as a switching element for each pixel. The TFT is constructed by a gate electrode formed on a transparent insulating substrate, a semiconductor active layer made of amorphous silicon opposing the gate electrode, a drain electrode and a source electrode connected to a transparent pixel electrode.

In the above-mentioned TFT, there is a large optical transmission area surrounding the semiconductor active layer. Therefore, light is incident from a backlight source through this optical transmission area to the semiconductor active layer. As a result, even when the TFT is in an OFF state, carriers are generated within the semiconductor active layer of the TFT to thereby increase an OFF current (leakage current) flowing therethrough. This may reduce the performance of the active matrix type LCD apparatus.

In order to reduce the OFF current, in a prior art active matrix type LCD apparatus, one optical shield layer is provided for each of the TFTs. In this case, the optical shield layer opposes the semiconductor active layer. This will be explained later in detail.

However, the optical shield layer creates a back gate effect in the semiconductor active layer. That is, the lower the back gate voltage, the smaller the OFF current of the drain current of the TFT. Therefore, if the voltage at the optical shield layer is decreased to decrease the back gate voltage of the TFT, the OFF current resulting from positive fixed charges generated in the periphery of the gate electrode can be suppressed. On the other hand, when the voltage at the drain electrode is written via the source electrode into the transparent pixel electrode, the voltage at the source electrode finally reaches the voltage at the drain electrode. In this state, the voltage at the optical shield layer is substantially replaced by $V_L - V_D$, where $V_L$ is the voltage at the optical shield layer and $V_D$ is the voltage at the drain electrode. This difference $V_L - V_D$ creates a back gate effect. As a result, the threshold voltage of the TFT is substantially reduced. Therefore, in order to completely carry out a write operation, the voltage at the optical shield layer has to be sufficiently high.

However, if the voltage at the optical shield layer is fixed at a sufficiently high voltage, the OFF current of the TFT caused by the above-mentioned positive fixed charges cannot be reduced. This invites display distortion due to the deterioration of the charge retention characteristics of the transparent pixel electrode.

Also, if the optical shield layer is in a floating state, the electric line from the gate electrode is blocked by the semiconductor active layer, and as a result, no substantial capacitive coupling between the gate electrode and the optical shield layer exists. Therefore, the voltage at the optical shield layer is determined by a mean voltage between the drain electrode and the source electrode. Even in this case, the OFF current of the TFT caused by the above-mentioned positive fixed charges cannot be reduced, so that display distortion due to the deterioration of the charge retention characteristics of the transparent pixel electrode is invited.

SUMMARY OF THE INVENTION

It is an object of the present invention to provide an active matrix type LCD apparatus having a optical shield layer capable of suppressing display distortion.

According to the present invention, in an LCD apparatus in an active matrix type liquid crystal display apparatus including a plurality of scan bus lines, a plurality of signal bus lines, a plurality of pixel electrodes, a plurality of TFTs, each having a gate connected to one of the scan bus lines, a drain connected to one of the signal bus lines and a source connected to one of the pixel electrodes, and a plurality of optical shield layers each for preventing light from penetrating one of the TFTs, a plurality of auxiliary TFTs are provided. Each of the auxiliary TFTs has a gate connected to one of the scan bus lines, a drain connected to one of the signal bus lines and a source connected to one of the light shield layers.

Thus, when the TFTs are turned ON and OFF, the corresponding additional TFTs are turned ON and OFF, respectively, so that the back gate voltages of the TFTs are changed. For example, in a write mode, the back gate voltage is high, while in an OFF mode, the back gate voltage is low.

BRIEF DESCRIPTION OF THE DRAWINGS

The present invention will be more clearly understood from the description as set forth below, as compared with the prior art, with reference to the accompanying drawings, wherein:

FIGS. 7A, 7B and 7C are plan views for explaining a manufacturing method of the apparatus of FIG. 4;

DESCRIPTION OF THE PREFERRED EMBODIMENTS

Before the description of the preferred embodiments, a prior art active matrix type LCD apparatus will be explained with reference to FIGS. 1, 2 and 3.

Figure 1:
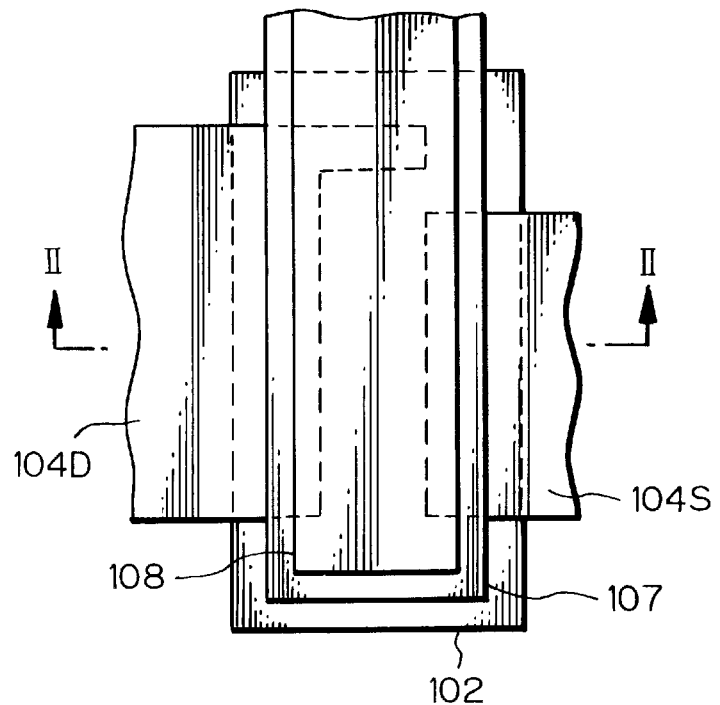
FIG. 1 is a plan view illustrating a prior art active matrix type LCD apparatus.
Figure 2:
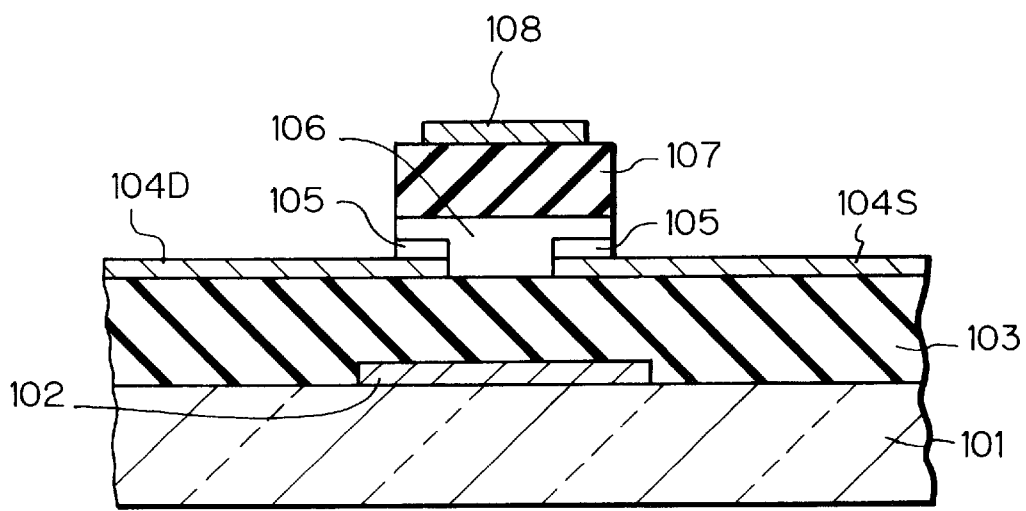
FIG. 2 is a cross-sectional view taken along the line II—II of FIG. 1.

FIG. 1 is a plan view illustrating a prior art active matrix type LCD apparatus, particularly, a TFT thereof, and FIG. 2 is a cross-sectional view taken along the line II—II of FIG. 1. In FIGS. 1 and 2, reference numeral 101 designates a transparent insulating substrate on which an optical shield layer 102 is formed. Also, an insulating layer 103 is formed on the entire surface.

Further, a transparent electrode layer made of indium tin oxide (ITO) and an N-type amorphous silicon layer are deposited on the entire surface and are patterned to form a drain electrode 104D, a source electrode 104S and N-type layers 105. Note that the source electrode 104S is in a body with a transparent pixel electrode (not shown).

In addition, a non-doped amorphous silicon layer, an insulating layer made of silicon oxide and a conductive layer made of Cr or the like are deposited and are patterned, so that a semiconductor active layer 106, a gate insulating layer 107 and a gate electrode 108 are formed.

The gate electrode 108 is usually formed simultaneously with a scan bus line (not shown). On the other hand, the drain electrode 104D is connected to a signal bus line (not shown). In this case, since the resistance of the transparent electrode layer is relatively high, the signal bus line is made of another material such as Cr to reduce the resistance thereof.

The side of the gate electrode 108 having a width of about 1 μm is cut back by so that a short circuit can be avoided between the gate electrode 108 and the drain and source electrodes 104D and 104S. In this case, an electric field within the semiconductor active layer 106 by the side of the gate electrode 108 is weak, and as a result, if positive fixed charges are caused in the periphery of the gate electrode 108 by the impurities of liquid crystal, electrons are induced in the semiconductor active layer 106, thus increasing an OFF current flowing through the TFT, which reduces the charge retention characteristics of the transparent pixel electrode.

The optical shield layer 102 prevents light from penetrating the TFT, thus suppressing the reduction of resistance of the semiconductor active layer 106. This enhances the charge retention characteristics of the transparent pixel electrode.

Figure 3:
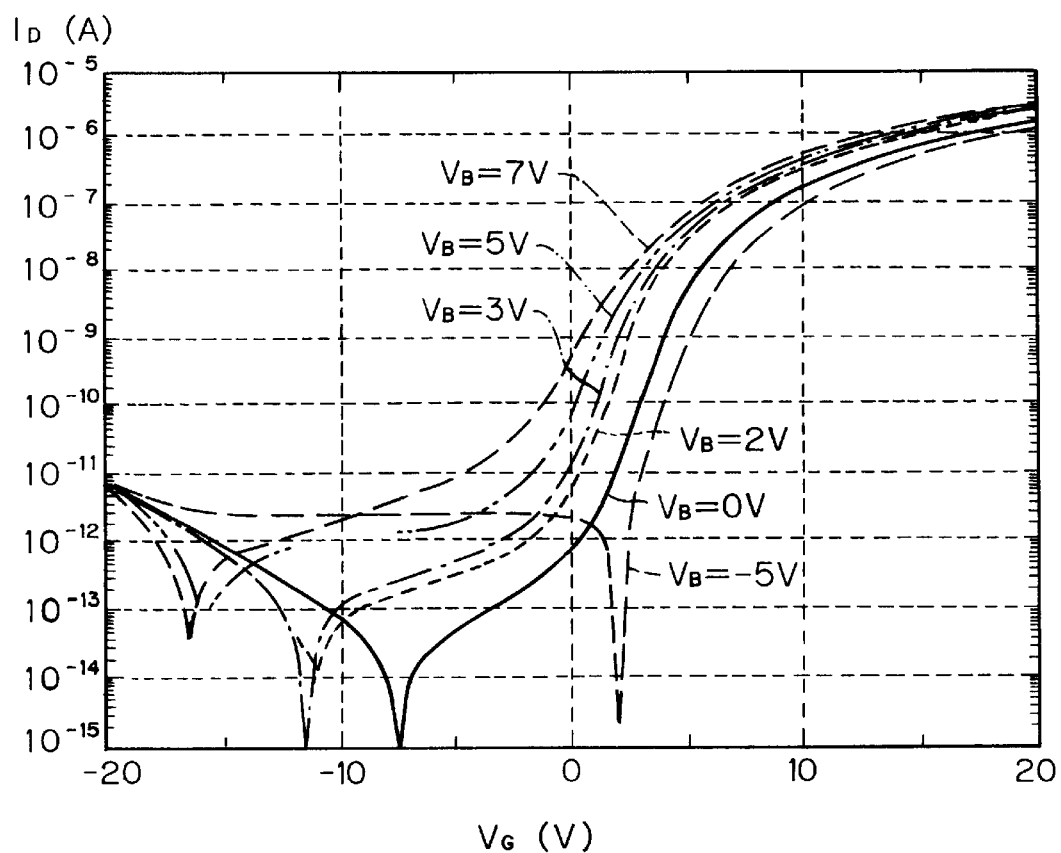
FIG. 3 is a graph showing a back gate effect of the TFT of FIG. 1.

The optical shield layer 102 creates a back gate effect in the semiconductor active layer 106 as shown in FIG. 3. That is, the lower the back gate voltage $V_B$, the smaller the OFF current of the drain current $I_D$. Note that the OFF current flows through the TFT, when the voltage $V_G$ at the gate electrode 108 is 0V. Therefore, if the voltage $V_L$ at the optical shield layer 102 is decreased to decrease the back gate voltage $V_B$ of the TFT, the OFF current resulting from the above-mentioned positive fixed charges can be suppressed. On the other hand, when the voltage $V_D$ at the drain electrode 104D is written via the source electrode 104S into the transparent pixel electrode, the voltage $V_S$ at the source electrode 104S finally reaches $V_D$. In this state, the voltage $V_L$ at the optical shield layer 102 is substantially replaced by $V_L-V_D$. This difference $V_L-V_D$ creates a back gate effect. As a result, the $V_G-I_D$ characteristics as shown in FIG. 3 are shifted toward the negative side by $\alpha(V_L-V_D)$, where $\alpha$ is a coefficient. In this case, the threshold voltage $V_{th}$ of the TFT is substantially reduced by $\alpha(V_L-V_D)$. Therefore, in order to completely carry out a write operation, the following formula has to be satisfied:

$$V_G^{ON}-V_D>V_{th}-\alpha(V_L-V_D) \tag{1}$$

If $V_D$=12V, $V_{th}$=2V, $V_G^{ON}$32 18 V and $\alpha$=1, the formula (1) is replaced by $$V_L>8 \text{ V} \tag{2}$$

However, if the voltage $V_L$ at the optical shield layer 102 is fixed at a high voltage higher than 8 V, the OFF current of the TFT caused by the above-mentioned positive fixed charges cannot be reduced. This invites display distortion due to the deterioration of the charge retention characteristics of the transparent pixel electrode.

Also, if it is assumed that the optical shield layer 102 is in a floating state, the electric line from the gate electrode 108 is blocked by the semiconductor active layer 106, and as a result, no substantial capacitive coupling between the gate electrode 108 and the optical shield layer 102 exists. Therefore, the voltage $V_L$ at the optical shield layer 102 is determined by a mean voltage between the drain electrode 104D and the source electrode 104S, i.e., about 7 V. Even in this case, the OFF current of the TFT caused by the above-mentioned positive fixed charges cannot be reduced, so that display distortion due to the deterioration of the charge retention characteristics of the transparent pixel electrode is invited.

Figure 4:
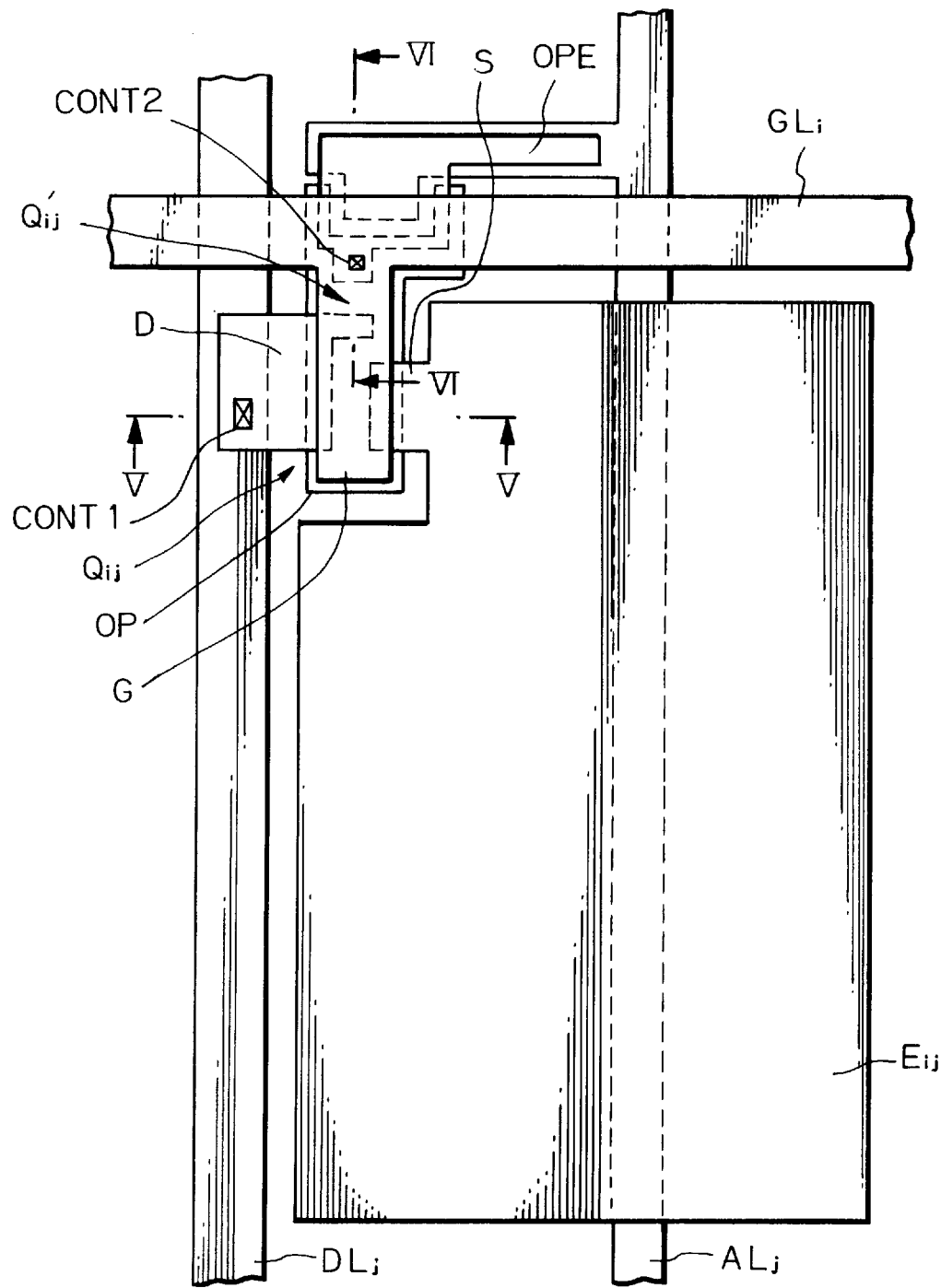
FIG. 4 is a plan view illustrating a first embodiment of the active matrix type LCD apparatus according to the present invention.

In FIG. 4, which illustrates a first embodiment of the present invention, a plurality of scan bus lines such as $GL_i$, which are also called gate bus lines, are arranged in parallel with each other, and a plurality of signal bus lines such as $DL_j$, which are also called drain bus lines, are arranged in parallel with each other. The scan bus lines are perpendicular to the signal bus lines.

A plurality of TFTs such as $Q_{ij}$ are provided at intersections between the scan bus lines and the signal buses. The TFT $Q_{ij}$ has a gate electrode G connected to the scan bus line $GL_i$, a drain electrode D connected via a contact hole CONT1 to the signal bus line $DL_j$, and a source electrode S connected to a transparent pixel electrode $E_{ij}$.

Also, a plurality of optical shield layers such as OP are provided. The optical shield layer OP opposes a semiconductor active layer (not shown) below the gate electrode G, thus suppressing the reduction of resistance of the semiconductor active layer of the TFT $Q_{ij}$.

The optical shield layer OP is further connected via a contact hole CONT2 to an optical shield electrode OPE, which is also capacitively coupled to an auxiliary bus line $AL_j$. The auxiliary bus line $AL_j$ is in parallel With the signal bus line $DL_j$.

Thus, an auxiliary TET $Q_{ij}'$ is constructed by the scan bus line $GL_i$ as a gate electrode, the drain electrode D and the optical shield electrode OPE as a source electrode. Also in this case, the optical shield layer OP opposes a semiconductor active layer (not shown) below the scan bus $GL_i$ (i.e., the gate electrode of the TET $Q_{ij}'$), thus suppressing the reduction of resistance of the semiconductor active layer of the TFT $Q_{ij}'$.

The auxiliary bus line $AL_j$ not only controls the voltage at the optical shield electrode OPE, but also forms a capacitor with the transparent pixel electrode $E_{ij}$.

The TFT $Q_{ij}$ of FIG. 4 is explained next in detail with reference to FIG. 5 which is a cross-sectional view taken along the line V—V of FIG. 4. That is, reference numeral 1 designates a transparent insulating substrate on which the signal bus line $DL_j$ and the optical shield layer OP are formed. The signal bus $DL_j$ and the optical shield layer OP are made of a Cr layer 2 and an indium tin oxide (ITO) layer 3.

Also, an insulating layer 4 made of silicon oxide is formed. Further, the drain electrode D and the source electrode S made of an ITO layer 5 are formed on the insulating layer 4. In this case, the drain electrode D is connected via the contact hole CONT1 to the signal bus line $DL_j$.

Further, an $N^+$-type impurity doped layer 6 is formed on the drain electrode D and the source electrode S.

In addition, a semiconductor active layer 7 made of non-doped amorphous, an insulating layer 8 made of amorphous silicon nitride and a gate electrode G formed by a Cr layer 9 are formed. Thus, the optical shield layer OP opposes the semiconductor active layer 7 below the gate electrode G, thus suppressing the reduction of resistance of the semiconductor active layer 7.

The auxiliary TFT $Q_{ij}'$ of FIG. 4 is explained next in detail with reference to FIG. 6 which is a cross-sectional view taken along the line VI—VI of FIG. 4. That is, the optical shield layer OP and the auxiliary bus line $AL_j$ are formed on the transparent insulating substrate 1. The optical shield layer OP and the auxiliary bus line $AL_j$ are made of the Cr layer 2 and the ITO layer 3.

Also, the insulating layer 4 made of silicon oxide is formed. Further, the drain electrode D and the optical shield electrode OPE made of the Cr layer 5 are formed on the insulating layer 4. In this case, the optical shield electrode OPE is connected via the contact hole CONT2 to the optical shield layer OP.

Further, $N^+$-type impurity doped layers 6 are formed on the drain electrode D and the optical shield electrode OPE.

In addition, the semiconductor active layer 7, the insulating layer 8 and the scan bus line $GL_i$ serving as a gate electrode are formed. Thus, the optical shield layer OP opposes the semiconductor active layer 7 below the gate electrode (the scan bus line $GL_i$), thus suppressing the reduction of resistance of the semiconductor active layer 7.

The manufacturing steps of the active matrix type LCD apparatus of FIG. 4 are explained next with reference to FIGS. 7A, 7B and 7C.

Figure 5:
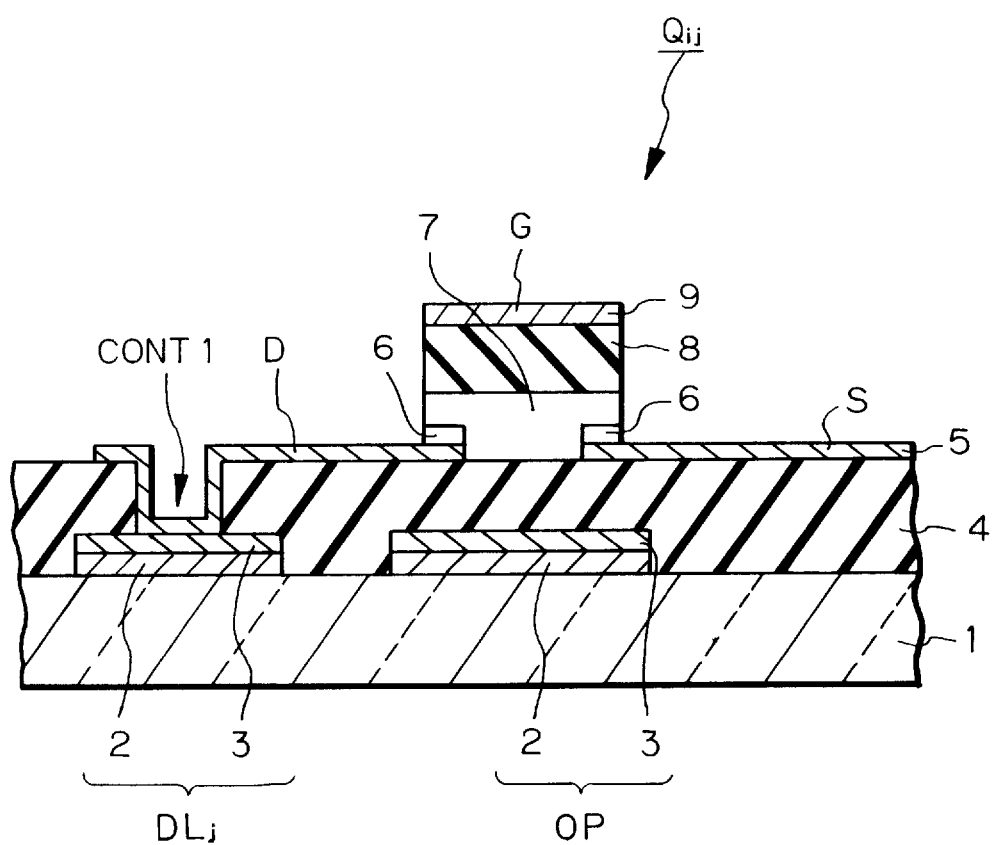
FIGS. 5 and 6 are cross-sectional views taken along the lines V—V and VI—VI, respectively, of FIG. 4.
Figure 6:
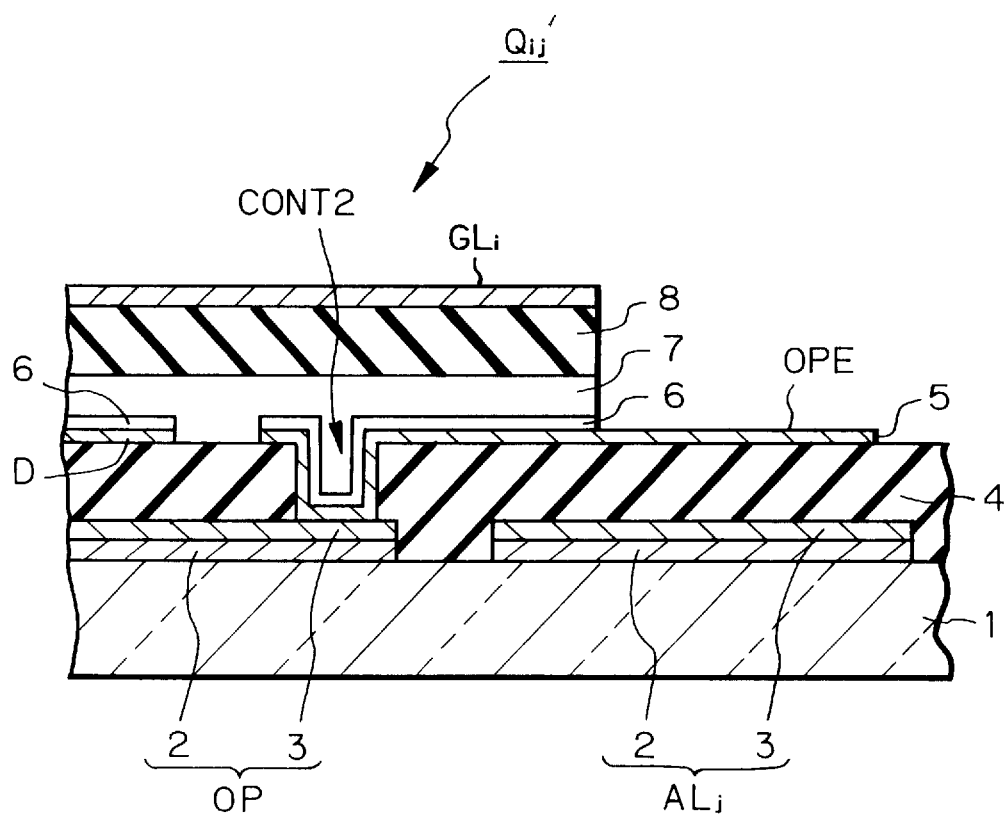

First, referring to FIG. 7A, an about 100 nm thick Cr layer 2 and an about 50 nm thick ITO layer 3 are deposited on a transparent insulating substrate 1 (see FIGS. 5 and 6). Then, the Cr layer 2 and the ITO layer 3 are patterned, so that the signal bus line $DL_j$, the auxiliary bus line $AL_j$, the optical shield layer OP and the optical shield electrode OPE are formed. In this case, since the Cr layer 2 is covered by the ITO layer 3, the Cr layer 2 is hardly eroded.

Next, referring to FIG. 7B, an about 400 nm thick insulating layer 4 made of silicon oxide (see FIGS. 5 and 6) is formed on the entire surface by an atmospheric pressure chemical vapor deposition (APCVD) process. Then, contact holes CONT1 and CONT2 are perforated in the insulating layer 4 by a dry etching process. In this case, contact holes (not shown) for terminals of the signal bus line $DL_j$ and the auxiliary bus line $AL_j$ are also perforated in the insulating layer 4.

Next, referring to FIG. 7C, an about 50 nm thick ITO layer 5 (see FIGS. 5 and 6) is deposited on the entire surface by a sputtering process, and also, an about 30 nm thick $N^+$-type amorphous silicon layer is deposited on the ITO layer 5 by a plasma CVD process. Then, the ITO layer 5 and the $N^+$-type amorphous silicon layer 6 are patterned, so that $N^+$-type impurity doped layers 6 (see FIGS. 5 and 6), the drain electrode D, the source electrode S, the transparent pixel electrode $E_{ij}$ and the optical shield electrode OPE are formed.

Finally, referring to FIG. 4, an about 50 nm thick non-doped amorphous silicon layer and an about 400 nm thick amorphous silicon nitride layer are sequentially deposited on the entire surface by a plasma CVD process. In addition, an about 150 nm thick Cr layer 9 is deposited on the amorphous silicon nitride layer by a sputtering process. Then, the Cr layer, the amorphous silicon nitride layer and the non-doped amorphous silicon layer are patterned, so that the gate electrode G, the scan bus line $GL_i$, the insulating layer 8 and the semiconductor active layer 7 (see FIGS. 5 and 6) are formed. In this case, the portion of the $N^+$-type impurity doped layers 6 outside of the gate electrode G and the scan bus line $GL_i$ is also removed.

In FIG. 7C, the $N^+$-type amorphous silicon layer is deposited on the ITO layer 5. However, instead of formation of the $N^+$-type amorphous silicon layer, phosphorus is deposited on the ITO layer 5 by a plasma electric discharging operation using $PH_3$ gas, so that ohmic contact between the semiconductor active layer 7 and the electrodes D and S can be realized.

In the first embodiment, the auxiliary TFT $Q_{ij}'$ is constructed by the scan bus line $GL_i$ as a gate electrode, the drain electrode D and the optical shield electrode OPE as a source electrode, and also, the optical shield electrode OPE is connected to the optical shield layer OP. Therefore, when a high voltage is applied by the scan bus line $GL_i$ to the TFT $Q_{ij}$ so that the TFT $Q_{ij}$ is turned ON, the auxiliary TFT $Q_{ij}'$ is also turned ON. As a result, the voltage at the optical shield layer OP becomes equal to the voltage at the signal bus line $DL_j$, so that the back gate voltage becomes high. Thus, a write operation can be completely carried out by the back gate effect.

On the other hand, when the voltage at the scan bus line $GL_i$ is changed from high to low to turn OFF the TET $Q_{ij}$, the voltage at the optical shield layer OP, i.e., the voltage at the optical shield layer OE is also decreased due to the capacitive coupling of the scan bus line $GL_i$ and the optical shield electrode OPE. In this case, the decrease of the voltage at the optical shield layer OE is determined by a capacitance between the optical shield layer OP (the optical shield electrode OPE) and other electrodes (conductive lines). That is, if the voltage at the auxiliary bus line $AL_j$ is optimized, the voltage at the optical shield layer OP can be sufficiently lowered, so that the OFF current of the TFT $Q_{ij}$ caused by the above-mentioned positive fixed charges can be reduced, to thereby improve the display distortion.

Figure 8:
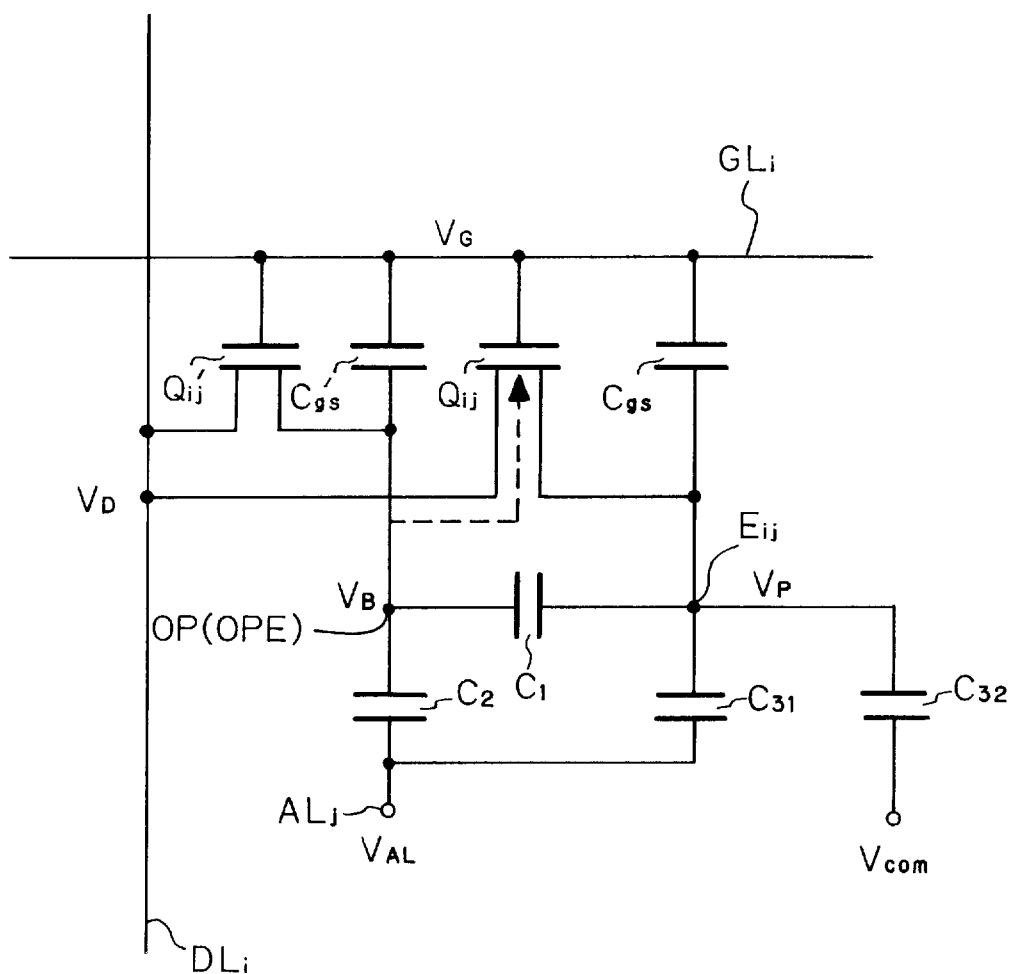
FIG. 8 is an equivalent circuit diagram of the apparatus of FIG. 4.

In FIG. 8, which is an equivalent circuit diagram of the apparatus of FIG. 4, $C_{gs}$ is a capacitance between the gate electrode G (the scan bus line $GL_i$) and the source electrode S (the transparent pixel electrode $E_{ij}$) of the TFT $Q_{ij}$, and $C_{gs}'$ is a capacitance between the gate electrode (the scan bus line $GL_i$) and the source electrode (the optical shield layer OP) of the auxiliary TFT $Q_{ij}'$. Also, $C_1$ is a capacitance between the source electrode S (the transparent pixel electrode $E_{ij}$) of the TFT $Q_{ij}$ and the source electrode (the optical shield layer OP) of the auxiliary TFT $Q_{ij}'$. Further, $C_2$ is a capacitance between the optical shield layer OP and the auxiliary bus line $AL_j$. In addition, $C_{31}$ is a capacitance between the transparent pixel electrode $E_{ij}$ and the auxiliary bus line $AL_j$, and $C_{32}$ is a capacitance between the transparent pixel electrode $E_{ij}$ and a counter electrode (not shown). Also, $V_{AL}$ is the voltage at the auxiliary bus line $AL_j$ and is 7 V, for example. Further, $V_{com}$ is the voltage at the counter electrode and is also 7 V, for example. In FIG. 8, the back gate effect by the optical shield layer OE is applied as indicated by a dotted arrow to the TFT $Q_{ij}$. For example, $C_{gs}$=9 nF
$C_{gs}'$=30 nF
$C_1$=9 nF $C_2$=60 nF
$C_3$=$C_{31}$+$C_{32}$=250 nF Also, the channel length and width of the TFT $Q_{ij}$ are 6 μm and 23 μm, respectively, and the channel length and width of the auxiliary TFT $Q_{ij}'$ are 6 μm and 12 μm, respectively. Further, the thickness of the gate insulating layer 8 corresponds to 300 nm of silicon oxide. In addition, the mobility of electrons is 0.3 cm²/V·sec, and the threshold voltage of the TFT $Q_{ij}$ and $Q_{ij}'$ is 2.0 V. The back gate effect can be modeled by the formula (1) where α=1.

Figure 9:
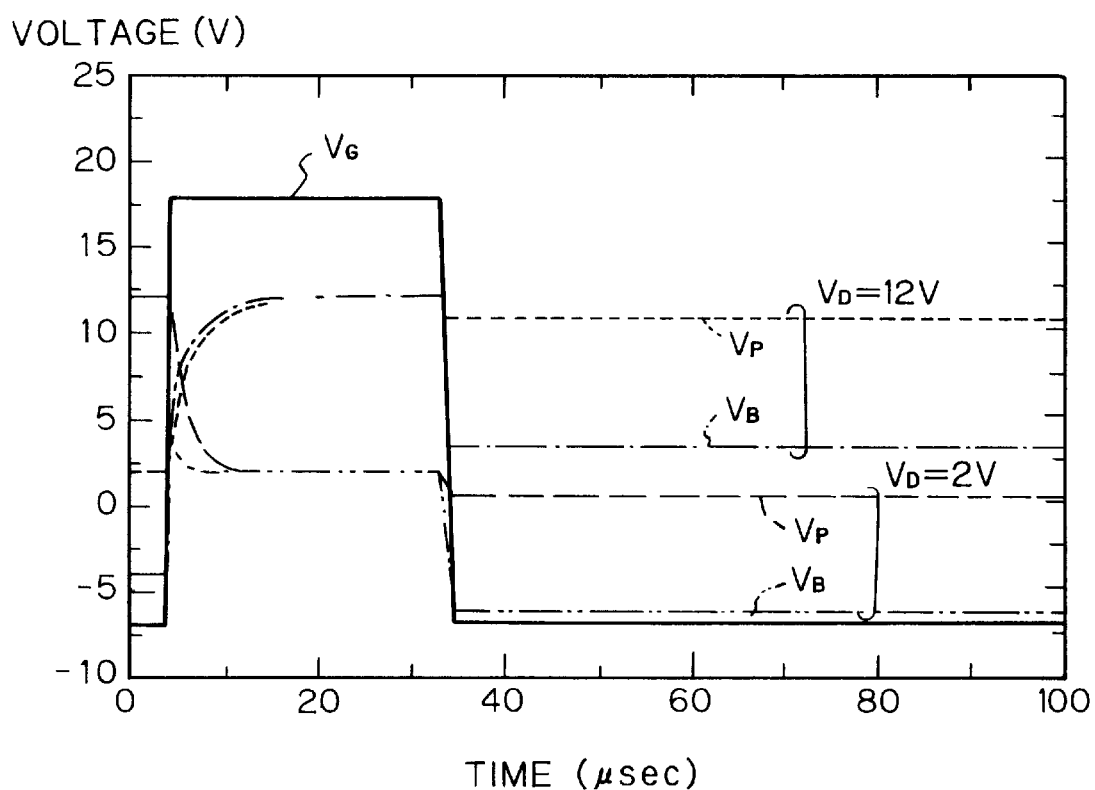
FIG. 9 is a timing diagram for showing the operation of the apparatus of FIG. 4.

The operation of the apparatus of FIG. 4 under the above-mentioned conditions for the circuit of FIG. 8 is explained next with reference to FIG. 9.

First, assume that the voltage $V_B$ at the optical shield layer OP and the voltage $V_P$ at the transparent pixel electrode $E_{ij}$ are initialized to 2 V, and then, the drain voltage $V_D$ (=12 V) at the signal bus line $DL_j$ is written into the transparent pixel electrode $E_{ij}$.

Then, when the gate voltage $V_G$ at the scan bus line $GL_i$ is changed from −7 V to 18 V, the auxiliary TFT $Q_{ij}'$ is turned ON, so that the back gate voltage $V_B$ is rapidly increased to 12 V. Therefore, the TFT $Q_{ij}$ is also completely turned ON within a write period of 30 μsec, so that the voltage $V_P$ at the transparent pixel electrode $E_{ij}$ is also raised to 12 V.

Then, when the gate voltage $V_G$ at the scan bus line $GL_i$ is changed from 18 V to −7 V, the back gate voltage $V_B$ is reduced by $$\Delta V_B = \Delta V_G \cdot C_{gs}'/(C_{gs}'+C_2) \quad (3)$$

Therefore, $$\begin{aligned}\Delta V_B &= (18V + 7V) \cdot 30nF/(30nF + 60nF) \\ &= 8.3V \\ \therefore V_B &= 12V - 8.3V \\ &= 3.7V > V_G^{OFF}(=-7V)\end{aligned}$$

Since $V_B > V_G^{OFF}$, the voltage $V_B$ at the optical shield layer OP is stabilized, so that the voltage $V_P$ at the transparent pixel electrode $E_{ij}$ is also stabilized.

On the other hand, assume that the voltage $V_B$ at the optical shield layer OP and the voltage $V_P$ at the transparent pixel electrode $E_{ij}$ are initialized to 12 V, and then, the drain voltage $V_D$ (=2 V) at the signal bus line $DL_j$ is written into the transparent pixel electrode $E_{ij}$. Then, when the gate voltage $V_G$ at the scan bus line $GL_i$ is changed from −7 V to 18 V, the auxiliary TFT $Q_{ij}'$ is turned, ON, so that the back gate voltage $V_B$ is rapidly increased to 2 V. Therefore, the TFT $Q_{ij}$ is also completely turned ON within a write period of 30 μsec, so that the voltage $V_P$ at the transparent pixel electrode $E_{ij}$ is also raised to 2 V.

Then, when the gate voltage $V_G$ at the scan bus line $GL_i$ is changed from 18 V to −7 V, the back gate voltage $V_B$ is reduced by $\Delta V_B$ determined by the formula (3). Therefore, $$\begin{aligned}\Delta V_B &= 8.3V \\ \therefore V_B &= 2V - 8.3V \\ &= -6.3V > V_G^{OFF}(=-7V)\end{aligned}$$

Also, since $V_B > V_G^{OFF}$, the voltage $V_B$ at the optical shield layer OP is stabilized, so that the voltage $V_P$ at the transparent pixel electrode $E_{ij}$ is also stabilized.

Figure 10:
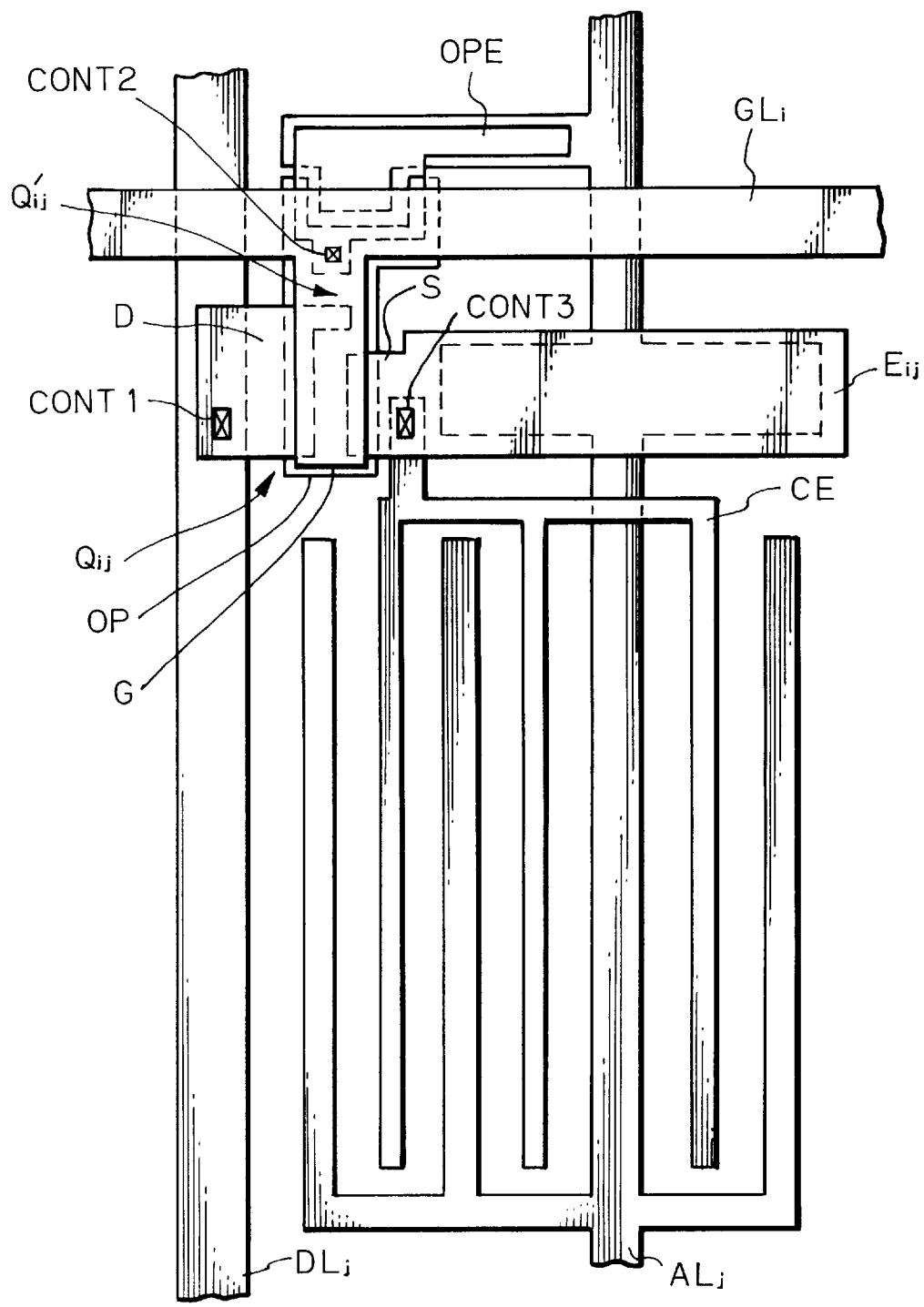
FIG. 10 is a plan view illustrating a second embodiment of the active matrix type LCD apparatus according to the present invention.

In FIG. 10, which illustrates a second embodiment of the present invention, the auxiliary bus line $AL_j$ extends over the entire surface of the transparent pixel electrode $E_{ij}$, to increase the capacitance $C_{31}$ of FIG. 8. Also, the auxiliary bus line $AL_j$ has a comb-shaped portion outside of the transparent pixel electrode $E_{ij}$. On the other hand, a counter electrode CE made of Cr is formed simultaneously with the formation of the scan bus line $GL_i$ (the source electrode S). The counter electrode CE is connected via a contact hole CONT3 to the transparent pixel electrode $E_{ij}$. Also, the counter electrode CE has a comb-shaped portion opposing the comb-shaped portion of the auxiliary bus line $AL_j$. As a result, when a voltage is applied to the scan bus line $GL_i$, liquid crystal between the two comb-shaped portions is controlled by an electric field therebetween.

The second embodiment is excellent in angle of visibility compared with the first embodiment.

As explained hereinabove, according to the present invention, the back gate voltage of the TFT can be changed. For example, the back gate voltage is made high in a write mode, and the back gate voltage is made low in an OFF mode. Therefore, the OFF current flowing through the TFT can be reduced, thus suppressing the display distortion.

I claim:

1. An active matrix type liquid crystal display apparatus comprising:

a plurality of scan bus lines;

a plurality of signal bus lines;

a plurality of pixel electrodes;

a plurality of first thin film transistors, each having a gate connected to one of said scan bus lines, a drain connected to one of said signal bus lines and a source connected to one of said pixel electrodes;

a plurality of optical shield layers each for preventing light from penetrating one of said first thin film transistors; and a plurality of second thin film transistors, each having a gate connected to one of said scan bus lines, a drain connected to one of said signal bus lines and a source connected to one of said optical shield layers.

2. The apparatus as set forth in claim 1, further comprising a plurality of optical shield electrodes each coupled to one of said optical shield layers, said optical shield electrodes serving as the sources of said second thin film transistors.

3. The apparatus as set forth in claim 2, further comprising a plurality of auxiliary bus lines each capacitively coupled to one of said optical shield electrodes.

4. The apparatus as set forth in claim 3, wherein each of said auxiliary bus lines is capacitively coupled to one of said pixel electrodes.

5. The apparatus as set forth in claim 3, wherein each of said auxiliary bus lines has a comb-shaped portion, said apparatus further comprising a plurality of counter electrodes, each connected to one of said pixel electrodes and having a comb-shaped portion opposing the comb-shaped portion of one of said auxiliary bus lines.

6. The apparatus as set forth in claim 3, wherein said auxiliary bus lines are in parallel with said signal bus lines.

7. An active matrix type liquid crystal display apparatus comprising:

a transparent insulating substrate;

a plurality of signal bus lines formed on said transparent insulating substrate;

a plurality of optical shield layers formed on said transparent insulating substrate;

a plurality of auxiliary bus lines formed on said transparent insulating substrate;

a first insulating layer formed on said signal bus lines, said optical shield layers and said auxiliary bus lines;

a plurality of drain electrodes formed on said first insulating layer, each of said drain electrodes being connected via a contact hole perforated in said first insulating layer to one of said signal bus lines;

a plurality of first source electrodes formed on said first insulating layer;

a plurality of transparent pixel electrodes formed on said first insulating layer, each of said transparent pixel electrodes being connected to one of said first source electrodes;

a plurality of second source electrodes formed on said first insulating layer, each of said second source electrodes being connected via a contact hole perforated in said first insulating layer to one of said optical shield electrodes, each of said second source electrodes opposing one of said auxiliary bus lines;

a plurality of semiconductor active layers each formed on said drain electrodes, said first source electrodes and said second source electrodes;

a second insulating layer formed on said semiconductor active layers; and a plurality of scan bus lines formed on said second insulating layer, each of said scan bus lines opposing one of said semiconductor active layers.

8. The apparatus as set forth in claim 7, wherein said signal bus lines, said optical shield layers and said auxiliary bus lines are formed by a conductive layer.

9. The apparatus as set forth in claim 8, wherein said conductive layer is made of Cr and indium tin oxide.

10. The apparatus as set forth in claim 7, wherein said drain electrodes, said first source electrodes, said second source electrodes and said transparent pixel electrodes are formed by a conductive layer.

11. The apparatus as set forth in claim 10, wherein said conductive layer is made of indium tin oxide.

12. The apparatus as set forth in claim 7, wherein each of said auxiliary bus lines has a comb-shaped portion, said apparatus further comprising a plurality of counter electrodes, each connected to one of said pixel electrodes and having a comb-shaped portion opposing the comb-shaped portion of one of said auxiliary bus lines.

13. The apparatus as set forth in claim 12, wherein said scan bus lines and said counter electrodes are formed by a conductive layer.

14. The apparatus as set forth in claim 13, wherein said conductive layer is made of Cr.

15. The apparatus as set forth in claim 7, wherein said auxiliary bus lines are in parallel with said signal bus lines.

\* \* \* \* \*

UNITED STATES PATENT AND TRADEMARK OFFICE
CERTIFICATE OF CORRECTION

PATENT NO. : 5,828,430
DATED : October 27, 1998
INVENTOR(S) : Shinichi NISHIDA

It is certified that error appears in the above-identified patent and that said Letters Patent is hereby corrected as shown below:

Column 4, line 1, delete "32" and insert -- = --;

Column 4, line 45, delete "With" and insert --with--;

Column 4, line 47, delete "TET" and insert --TFT--; and

Column 4, line 52, delete "TET" and insert --TFT--.

Column 6, line 31, delete "TET" and insert --TFT--.

Column 7, line 3, delete "TET" and insert --TFT--; and

Column 7, line 48, delete "turned" and insert --turned--.

Signed and Sealed this

Eighth Day of June, 1999

Attest:

Q. TODD DICKINSON

*Attesting Officer*   *Acting Commissioner of Patents and Trademarks*